(12) United States Patent
DeLoy (10) Patent No.: US 10,136,271 B2
(45) Date of Patent: Nov. 20, 2018

(54) AUTOMATICALLY ANSWERING AN INCOMING VOICE-CALL ON A MOBILE DEVICE WITH NO-TOUCH USER INTERFACE INTERACTION

(71) Applicant: T-Mobile USA, Inc., Bellevue, WA (US)

(72) Inventor: Todd DeLoy, Murfreesboro, TN (US)

(73) Assignee: T-Mobile USA, Inc., Bellevue, WA (US)

( * ) Notice: Subject to any disclaimer, the term of this patent is extended or adjusted under 35 U.S.C. 154(b) by 195 days.

(21) Appl. No.: 14/967,203

(22) Filed: Dec. 11, 2015

(65) Prior Publication Data

US 2017/0171727 A1 Jun. 15, 2017

(51) Int. Cl.
| | |
|---|---|
| *H04W 4/16* | (2009.01) |
| *H04M 1/64* | (2006.01) |
| *H04M 3/42* | (2006.01) |
| *H04W 4/021* | (2018.01) |
| *H04W 4/02* | (2018.01) |
| *G06F 3/0346* | (2013.01) |

(52) U.S. Cl.
CPC ............ *H04W 4/16* (2013.01); *G06F 3/0346* (2013.01); *H04M 1/64* (2013.01); *H04M 3/42153* (2013.01); *H04M 3/42212* (2013.01); *H04W 4/021* (2013.01); *H04W 4/027* (2013.01); *H04M 2250/12* (2013.01)

(58) Field of Classification Search
CPC ............ H04M 3/42; H04M 1/60; H04M 1/66; H04M 2250/22; H04M 1/72569; H04M 1/7258; H04M 1/725; H04M 1/67; H04M 1/27; G01P 15/00; G01P 14/18; G06F 3/01

See application file for complete search history.

(56) References Cited

U.S. PATENT DOCUMENTS

| | | | | |
|---|---|---|---|---|
| 9,094,519 | B1* | 7/2015 | Shuman | ................. H04M 3/54 |
| 9,350,918 | B1* | 5/2016 | Baldwin | ............ H04N 5/23296 |
| 9,696,337 | B2* | 7/2017 | Huang | .................... G01P 15/00 |
| 2004/0198332 | A1* | 10/2004 | Lundsgaard | ........ H04M 1/6083 |
| | | | | 455/417 |
| 2004/0266399 | A1* | 12/2004 | Simpson | ........... H04M 3/42017 |
| | | | | 455/412.1 |
| 2005/0233766 | A1* | 10/2005 | Futami | .................... H04M 1/64 |
| | | | | 455/556.1 |
| 2009/0088230 | A1* | 4/2009 | Park | ....................... C02F 1/325 |
| | | | | 455/575.6 |

(Continued)

FOREIGN PATENT DOCUMENTS

| | | | | |
|---|---|---|---|---|
| EP | 3091422 A1 * | 11/2016 | ............. | G06F 3/016 |
| WO | WO 2007140806 A1 * | 12/2007 | ........... | G06F 1/1616 |

*Primary Examiner* — Christopher M Brandt
(74) *Attorney, Agent, or Firm* — Lee & Hayes, PLLC (57) ABSTRACT

This disclosure describes techniques for automatically answering an incoming voice-call on a mobile device. A voice-call answering application, executed on the mobile device, may allow a user to answer an incoming voice-call by applying a movement or a biometric sample that is preconfigured to answer the incoming voice-call. In some examples, the user may preconfigure the voice-call answering application to recognize different movements or biometric samples based on a time of day, a day of the week, a geographic location, or a type of motion.

20 Claims, 6 Drawing Sheets

(56) References Cited

U.S. PATENT DOCUMENTS

| | | | |
|---|---|---|---|
| 2012/0157169 A1* | 6/2012 | Katz | G06F 1/3203 455/566 |
| 2013/0189963 A1* | 7/2013 | Epp | H04M 1/64 455/414.1 |
| 2014/0370933 A1* | 12/2014 | Xie | G06F 1/1626 455/550.1 |
| 2015/0011195 A1* | 1/2015 | Li | H03G 3/3026 455/418 |
| 2015/0148011 A1* | 5/2015 | Chen | H04L 51/04 455/412.2 |
| 2015/0316990 A1* | 11/2015 | Pacheco | G06F 3/017 715/716 |
| 2015/0350198 A1* | 12/2015 | Li | H04L 63/0823 713/156 |
| 2016/0054808 A1* | 2/2016 | Cho | G06F 3/017 345/156 |
| 2017/0150321 A1* | 5/2017 | Ciecko | H04W 4/028 |
| 2017/0295272 A1* | 10/2017 | Gan | H04M 1/605 |

* cited by examiner

FIG. 2

CUSTOMIZATION USER INTERFACE
302

ACTIVE CONFIGURATION(S): | 1, 2, 3, 6, 9 | (MODIFY)

CONFIGURATION IDENTITY: | 1 ▼ | (SELECT) (CREATE)

ACTIVATION SETTING:

▼
- TIME OF DAY | 9AM – 5PM
- DAY OF WEEK | M, T, W, T, F
- GEOGRAPHIC LOCATION | HOME
- TYPE OF MOTION | WALKING (SELECT) (CREATE) (MODIFY)

TEMPLATE SELECTION: ☒ MOVEMENT ☐ BIOMETRIC

▼
- ANSWERING VOICE-CALL FROM WAIST POCKET
- ANSWERING VOICE CALL FROM DESK TOP (SELECT) (CREATE) (MODIFY)

PHONE SETTING: ☐ EAR-PIECE SPEAKER ☐ BUILT-IN SPEAKER

AUTOMATICALLY ANSWERING AN INCOMING VOICE-CALL ON A MOBILE DEVICE WITH NO-TOUCH USER INTERFACE INTERACTION

BACKGROUND

Presently, the popularity of mobile communication devices, such as mobile telephones and smartphones, provides users with an ability to engage in activities concurrently while having a phone conversation. Traditionally, during a telephone conversation, a user is required to perform some physical act, such as pushing a button to accept an incoming voice-call. If the user is engaged in a physical activity during that time, the user may not be able to push a button to initiate the voice-call, and the call may go unanswered.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure sets forth systems and techniques for automatically answering incoming voice-calls on mobile devices. Traditionally, to accept an incoming voice-call, a user may be required to interact with a user interface of a mobile device, by pushing a button or performing some physical act on the user interface. This holds true irrespective of whether the user engages in the telephone conversation via the mobile device itself, or through a peripheral device such as a communications headset or a conventional hands-free system. This disclosure describes techniques to streamline the process of answering a voice-call by eliminating any interaction with the user interface of the mobile device. Particularly, a voice-call answering application, executed on the mobile device, may allow a user to answer an incoming voice-call by applying a particular movement to the mobile device, or by applying a preconfigured biometric sample.

In one example, a user may motion to raise a mobile device to the user's ear and mouth, and in response to validating the user's motion, the voice-call answering application may automatically answer an incoming voice-call. In various examples, the voice-call answering application may allow a user to generate different motions that may be used as templates to automatically answer an incoming voice-call. In one example, a user may move a mobile device from a first position that is away from the user's ear and mouth to a second position that is adjacent to the user's ear and mouth. The first position may correspond to a waist pocket of the user, or a desk table at the user's work location. In another example, the motion may comprise of a 'side-tap' of the mobile device.

In some examples, a user may apply a biometric sample to the mobile device, and in response to validating the biometric sample, the voice-call answering application may automatically answer an incoming voice-call. The user may provide the biometric sample unobtrusively, meaning that the user need not specifically interact with the mobile device for the purpose of providing the biometric sample. For example, an unobtrusive biometric sample may include a facial image of the user, a hand thermogram that may employ a heat-based signature, or a user's grip configuration that detects a relative position of fingers when holding and touching the mobile device.

In various examples, the voice-call answering application may include functionality to generate different motion templates and biometric templates that may cause the voice-call answering application to automatically answer an incoming voice-call. Further, the voice-call answering application may allow a user to assign different movement templates and biometric templates to particular environmental conditions and situations. Environmental conditions and situations may include a time of day, a day of the week, a particular geographic location, or a type of motion. For example, if an incoming voice-call is received while the user is running with the mobile device, a movement template may be configured with a movement of the mobile device from a waist pocket of the user to a position adjacent to the user's ear and mouth. In another example, if an incoming voice-call is received while the user is at a work location, a movement template may be configured with a movement of the mobile device from a desk table to a position adjacent to the user's ear and mouth. In yet another example, if an incoming voice-call is received during a particular time of the day when the user is busy, a movement template may be configured with a 'side tap' movement of the mobile device.

The term "techniques," for instance, may refer to system(s), method(s), computer-readable instructions, module(s), algorithms, hardware logic, and/or operation(s) as permitted by the context described above and throughout the document.

Figure 1:
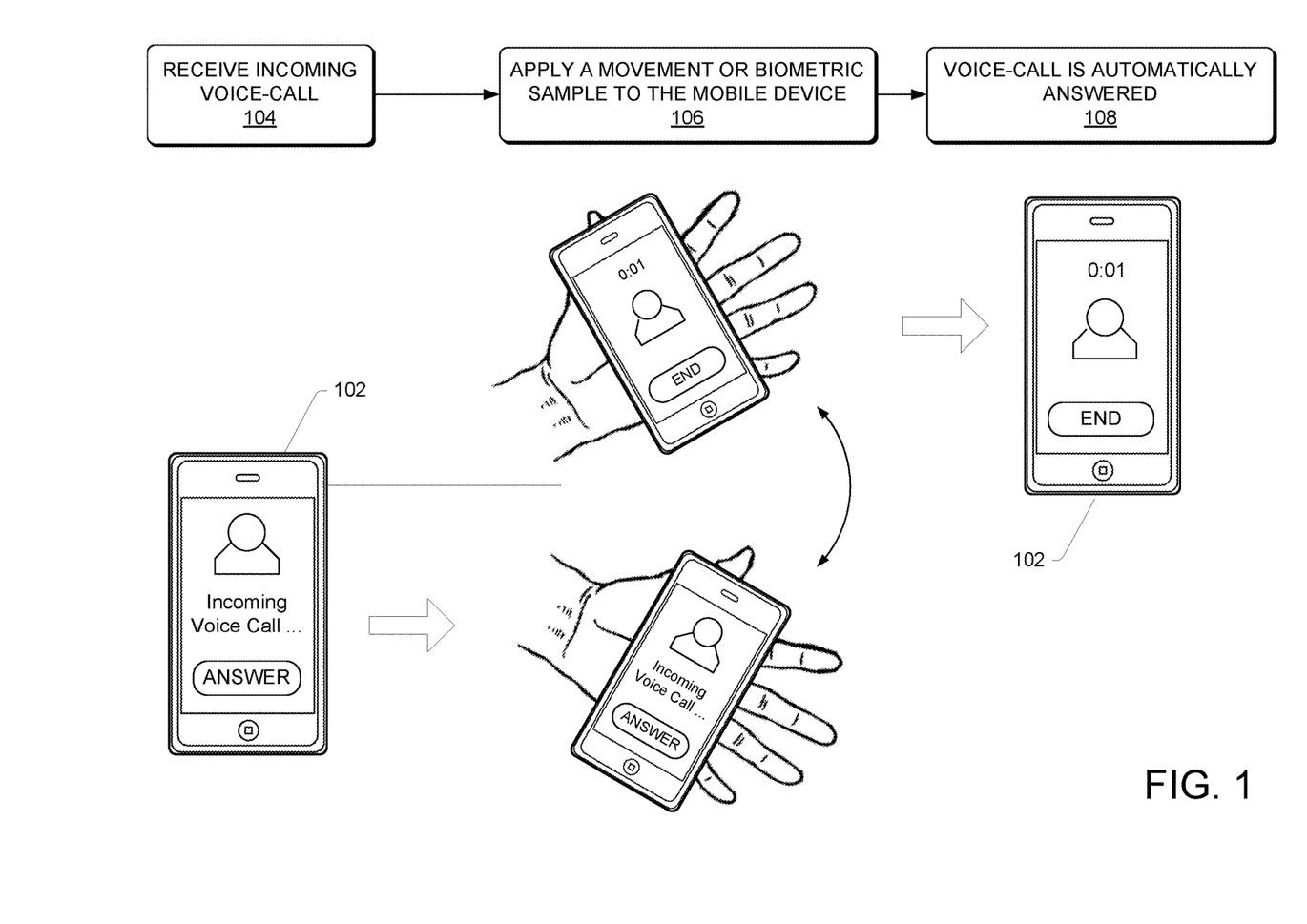
FIG. 1 illustrates a schematic view of a user of a mobile device automatically answering an incoming voice-call based on a movement of the mobile device.

FIG. 1 illustrates a schematic view of a user of a mobile device 102 automatically answering an incoming voice-call based on a movement of the mobile device. At block 104, a voice-call answering application may detect an incoming voice-call that is directed to the mobile device. In doing so, the voice-call answering application may enable particular functionality of the automatic voice-call answering application on the mobile device.

At block 106, the user of the mobile device may apply a movement or a biometric sample to the mobile device. In a non-limiting example, the movement of the mobile device may include moving the mobile device from a first position that is away from the user's ear and mouth to a second position that is adjacent to the user's ear and mouth. In another example, the movement may be a 'side-tap' of the mobile device. In another non-limiting example, the user may provide a biometric sample to the mobile device. In some examples, a biometric sample may be provided unobtrusively, without interacting with a user interface of the mobile device. For example, a capacitance sensor of the mobile device may detect a user's grip configuration of the mobile device. Other types of unobtrusive biometric samples may include a facial image of the user, or a hand thermogram that may employ a heat-based signature.

At block 108, in response to verifying a validity of the user's movement or the biometric sample, the voice-call answering application may automatically answer the incoming voice-call, without requiring the user to interact with a user interface of the mobile device.

Figure 2:
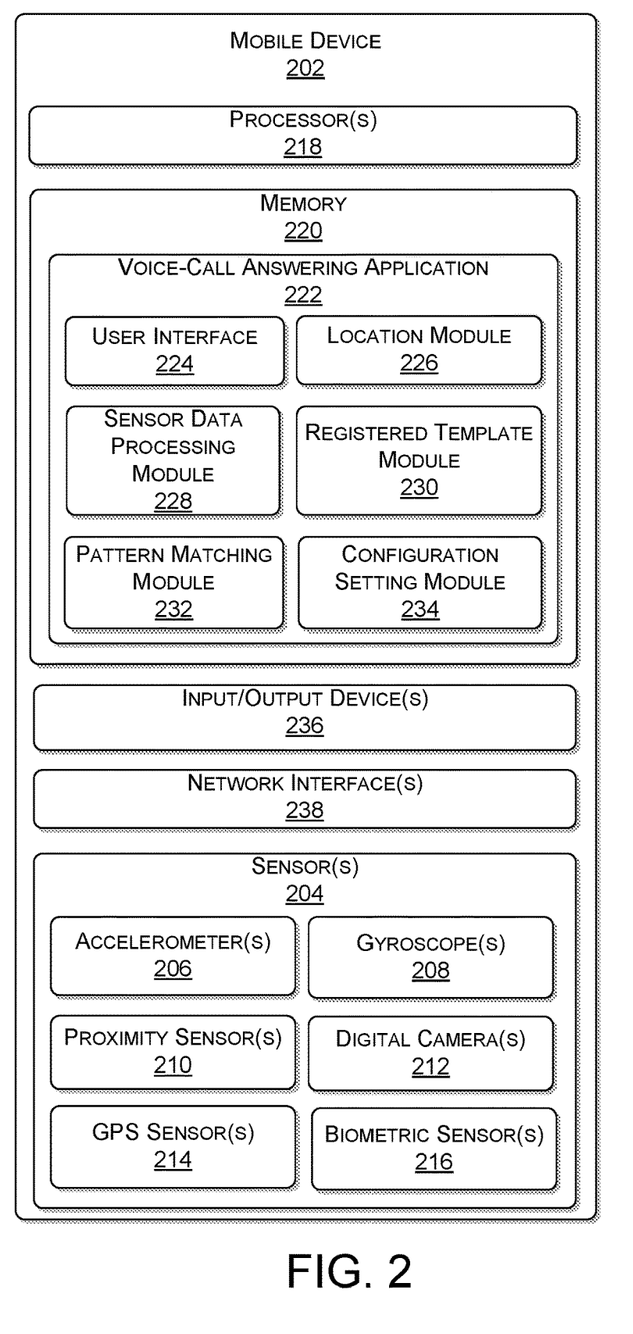
FIG. 2 illustrates a block diagram of a mobile device that is capable of automatically answering an incoming voice-call.

FIG. 2 illustrates a block diagram of a mobile device 202 that is capable of automatically answering an incoming voice-call. In the illustrated example, the mobile device 202 may include one or more sensor(s) 204 that monitor and receive signal data that corresponds to a movement of the mobile device or a biometric sample of a user of the mobile device. In some examples, the one or more sensor(s) 204 may detect and measure movement of the mobile device 202 any one of the six degrees of freedom. Types of the one or more sensor(s) 204 may include, but are not limited to, one or more accelerometer(s) 206, a gyroscope 208, proximity sensor(s) 210, digital camera(s) 212, and a global positioning system (GPS) sensor 214. However, other sensors that detect motion may also be used, as described herein.

The one or more sensor(s) 204 may be used to detect a translational movement and a rotational movement of the mobile device 202. For example, a user may manually move a mobile device 202 from a first static position located away from the user's ear and mouth, to a second position held near the user's ear and mouth.

In various examples, the mobile device 202 may be configured with one or more accelerometer(s) 206 that measure a movement of the mobile device 202 in at least some of the six translational degrees of freedom. In some examples, the mobile device 202 may be configured with more than one accelerometer 206. Here, the accelerometer(s) 206 may be offset from one another in each of the three translational planes. Doing so allows for a calculation of a change in angular orientation of the mobile device 202, which may be helpful in determining whether the speaker of the mobile device 202 is oriented near a user's ear, or that the microphone of the mobile device 202 is adjacent to the user's mouth.

In some examples, the one or more accelerometer(s) 206 may also measure a vibration or oscillation of the mobile device 202. In some examples, a measured vibration or oscillation may be used to identify a particular template of movement for automatically answering an incoming voice-call. In one example, the one or more accelerometer(s) 206 may detect an amount of vibration and oscillation of the mobile device 202. In this example, identifying a vibration may be used to determine that the user of the mobile device 202 is currently in motion, and the oscillation may help determine whether the mobile device 202 is being stored in the user's waist pocket, or in a separate bag. In other words, short-wave pendulum-like oscillations may suggest that the mobile device 202 is being stored in the user's waist pocket, while long-wave pendulum oscillations may suggest that the mobile device is being carried in a bag along the user's side. Further, vertical up-and-down oscillations may suggest that the mobile device 202 is being carried in a backpack. Therefore, in response to identifying a type of motion of the user, and a particular storage location of the mobile device 202 during that motion, a particular template of movement may be selected for automatically answering an incoming voice-call.

In some examples, the functionality of automatically answering an incoming voice-call may be enabled or disabled, based at least in part on a location of the mobile device 202. Using the above example, in response to determining that the mobile device 202 is stored in a user's waist pocket, the functionality of automatically answering an incoming voice-call may be enabled. Alternatively, or additionally, in response to determining that the mobile device 202 is stored in a user's bag, the functionality of automatically answering an incoming voice-call may be disabled.

In some examples, a gyroscope 208 can be used to detect an angular position of the mobile device 202, which may be used as one aspect of a particular template of movement to automatically answer a voice-call. For example, the angular position of the mobile device 202 may be used to determine that the speaker of the mobile device 202 is adjacent to a user's ear, and the microphone is adjacent to the user's mouth.

Further, proximity sensor(s) 210 and/or digital camera(s) 212 may be used to measure a movement of the mobile device along a particular axis. In some examples, the proximity sensor(s) 210 may be used to detect stationary, open, or enclosed areas. For example, detecting a stationary area may correspond to a lack of movement of the mobile device. In a non-limiting example, detecting an open area may correspond to the mobile device 202 being positioned on a top surface of a table. Further, detecting an enclosed area may correspond to the mobile device 202 being positioned in a bag or a user's waist pocket.

In some examples, the digital camera(s) 212 may record low resolution imagery at a high frame rate that is greater than typical video production. In doing so, imagery may be analyzed to quantify a movement of the mobile device 202 along a particular axis, or axes. Alternatively, or additionally, signal data from the proximity sensor(s) 210 and/or digital camera to measure a movement that may correspond to raising the mobile device 202 to the user's ear.

The GPS sensor(s) 214 may be used to determine a geolocation of the mobile device 202. In some examples, the geographic location of the mobile device 202 may be used to enable or disable a functionality of automatically answering an incoming voice-call. In a non-limiting example, the GPS sensor(s) 214 may determine that the mobile device 202 is located at or near a work location or a home location associated with the user. In doing so, a user may elect to enable the functionality at a work location, but disable the same functionality at a home location.

In some examples, sensor data from one or more sensor(s) 204 may be combined to determine a movement of the mobile device 202. For example, sensor data from one or more accelerometer(s) and a proximity sensor may be compared to approximate a movement of the mobile device. Further, sensor data from the one or more sensor(s) 204 may be combined to further refine a particular motion of the mobile device 202. In a non-limiting example, the GPS sensor(s) 214 may determine that a motion of the mobile device 202 corresponds to a walking motion of the user. Sensor data from the proximity sensor(s) 210, may further determine that the mobile device is likely stored in an enclosed area, such as a user's bag or a user's waist pocket. Further, sensor data from one or more accelerometer(s) 206 may detect a short-wave pendulum-like oscillations that may suggest that the mobile device 202 is being stored in the user's waist pocket, rather than within a user's bag. Therefore, a combination of sensor data from the GPS sensor(s) 214, the proximity sensor(s) 210, and one or more accelerometer(s) 206 may determine that the mobile device 202 is being carried in a user's waist pocket, while the user is walking.

In various examples, the mobile device 202 may include biometric sensors that may detect various biometric samples of a user of the mobile device 202. For example, a capacitance sensor may detect a grip configuration of a user holding the mobile device 202. In this example, a biometric sample may comprise of the relative position of fingers when holding and touching the mobile device. Other sensors may include an odor sensor and a heart-beat sensor.

In the illustrated example, the mobile device 202 may include one or more processor(s) 218 operable connected to memory 220. In at least one example, the one or more processor(s) 218 may be central processing unit(s) (CPU), graphics processing unit(s) (GPU), a both a CPU and GPU, or any other sort of processing unit(s). Each of the one or more processors(s) 218 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 218 may also be responsible for executing all computer applications stored in the memory, which can be associated with common types of volatile (RAM) and/or nonvolatile (ROM) memory.

In some examples, memory 220 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 220 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 220 may include a voice-call answering application 222. The voice-call answering application 222 may control the functionality of automatically answering an incoming voice-call. The voice-call answering application 222 may include a user interface 224, a location module 226, a sensor data processing module 228, a registered template module 230, a pattern-matching module 232, and a configuration setting module 234.

In the illustrated example, the voice-call answering application 222 may include a location module 226. The location module 226 may obtain location data associated with the mobile device 202. In some examples, the location data may be obtained using the GPS sensor(s) 214, cell tower triangulations, or any other manner that can be used to identify the physical location of the mobile device 202.

In the illustrated example, the voice-call answering application 222 may include a sensor data processing module 228. The sensor data processing module 228 may process sensor data associated with the one or more sensor(s) 204 and determine a particular movement of the mobile device 202, as well as environmental conditions surrounding the mobile device 202. In a non-limiting example, the sensor data processing module 228 may interpret signals from proximity sensor(s) 210 of the mobile device 202 to determine that the mobile device 202 is being carried in a user's waist pocket. Alternatively, the sensor data processing module 228 may combine sensor data from different sensors of the one or more sensor(s) 204, such as the GPS sensor(s) 214, the one or more accelerometer(s) 206, and the proximity sensor(s) 210, to determine that the mobile device 202 is stationery relative to a user and being stored in an enclosed space, such as a bag or a user's waist pocket.

Further, the sensor data processing module 228 may also interpret biometric samples received from a user via the mobile device 202. In one example, a biometric sample may include a grip configuration may include the relative position of fingers when holding and touching the mobile device. Another example may include a facial image of a user, or a hand thermogram that may employ a heat-based signature. Further, face/head biometric samples may include a facial thermogram that measure a heat signature of a user's face or head. The heat signature may be limited to features associated with a user's earlobe or lips, which is commensurate with regions of a user's face that the mobile device is likely to overlap while a user answers an incoming voice-call. Other biometric samples may include vascular biometrics such as blood pressure can also represent example biometrics.

Further, some biometric samples may be obtained from a user using an unobtrusive process, and thus captured without distracting the user. For example, detecting an image of the user's face, heat beat patterns (or rhythms in heart rate), odor or pheromone may represent example of unobtrusively capturing biometric samples.

In the illustrated example, the voice-call answering application 222 may include a registered template module 230. The registered template module 230 may allow a user to construct statistical pattern-matching templates that can be used as reference templates to enable the automatic voice-call answering functionality.

In some examples, the registered template module 230 may allow users to construct a registered movement template. A registered movement template may model a movement of the mobile device from a first static position located away from the user's ear and mouth, to a second position held near the user's ear and mouth. In some examples, the first static position may correspond to a user's waist pocket, a user's office desk, a desk drawer, or some other physical location. The registered movement template may account for a translation and rotation of the mobile device.

In other examples, the registered movement template may model a movement of the mobile device that is entirely different from moving the mobile device towards the user's ear and mouth. For example, a registered movement template may model a 'side-tap' motion of the mobile device. This type of registered movement template may be beneficial if the user is working at a time of receiving an incoming voice-call and is unable to pick up the mobile device.

The registered template module 230 may generate a registered movement template by having a user repeat a same particular motion a predetermined number of times. The repetition allows for a construction of a statistically reliable template of the particular motion.

In various examples, the registered template module 230 may construct a registered biometric template that can be used as a reference template for biometric samples received from a user of the mobile device. A registered biometric template may be generated by first receiving biometric samples from the user that correspond to a particular type of biometric data. The type of biometric data is limited only by the sensory capability of the mobile device. In a non-limiting example, the biometric data may correspond to a grip configuration of the mobile device, a heart-beat pattern, a hand thermogram, a facial thermogram, as well as other vascular biometrics such as blood pressure. The user may be required to provide several biometric samples of the same type of biometric data. In doing so, a statistically reliable template of the particular biometric type may be constructed and stored as a registered biometric template.

In the illustrated example, the registered template module 230 may include a data-store to store the registered movement templates and the registered biometric templates. In some examples, the registered template module 230 may store one or more registered movement templates, and one or more registered biometric templates.

In the illustrated example, the voice-call answering application 222 may include a pattern-matching module 232. The pattern-match module 232 may compare a movement of the mobile device 202 with a registered movement template that is stored in the registered template module 230 data-store. The pattern-matching module 232 may use statistically reliable pattern matching techniques to ensure that a movement of the mobile device 202 reliably matches a registered movement template associated with the mobile device 202.

In some examples, the pattern-matching module 232 may compare biometric features associated with a user of the mobile device 202 with registered biometric templates stored in the registered template module 230 data-store. In doing so, the pattern-matching module 232 may, again, use statistically reliable pattern matching techniques to ensure that biometric samples received from the user, reliably matches a registered biometric template.

In the illustrated example, the voice-call answering application 222 may include a configuration setting module 234. The configuration setting module 234 may allow a user to assign different registered movement templates to different environmental conditions and situations via a user interface 224. Environmental conditions may correspond to particular types of motion, such as walking or running, or particular geographic locations, such as a home location or a work location. For example, if the sensor data processing module 228 determines that a motion of the mobile device 202 is consistent with the user walking or running, the configuration setting module 234 may enable a particular registered movement template that is configured for use while the user is walking or running. That is, if an incoming voice-call is received while the user is walking or running, the configuration setting module 234 may select a registered movement template that is configured for that type of movement. In other words, if a user normally stores their mobile device 202 in a waist pocket while walking or running, the configuration setting module 234 may select a registered movement template that reflects a motion of the mobile device 202 from a first position in the user's waist pocket to a second position adjacent to the user's ear and mouth.

In another example, the configuration setting module 234 may allow a user to assign a registered biometric template to a particular geographic location. For example, if the location module 226 determines that the mobile device 202 is located at the user's work location, the configuration setting module 234 may use a registered biometric template to enable automatic voice-call answering.

In some examples, the configuration setting module 234 may also allow the user to control phone settings such as a use of a built-in speaker of the mobile device. In this example, a user may receive an incoming voice-call while working, and may prefer not to pick up the mobile device. Thus, it would be beneficial for the audio associated with the incoming voice-call to be transmitted through a built-in speaker of the mobile device.

In the illustrated example, the input/output device(s) 236 may include any type of output devices known in the art, such as a display (e.g. a liquid crystal display), speakers, a vibrating mechanism, or a tactile feedback mechanism. Input/output devices also include ports for one or more peripheral devices, such as headphones, peripheral speakers, or a peripheral display. Further, the input/output devices module includes any type of input devices known in the art. For example, input/output device(s) 236 may include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the network interface(s) 238 may include any sort of transceiver known in the art. For example, the network interface(s) 238 may include a radio transceiver that performs the function of transmitting and receiving radio frequency communications via an antenna. The network interface(s) 238 may facilitate wireless connectivity between the mobile device and other electronic devices through a telecommunication network, such as a remote telecommunication server. In addition, the network interface(s) 238 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 238 may include wired communication components, such as an Ethernet port or a Universal Serial Bus (USB).

Figure 3:
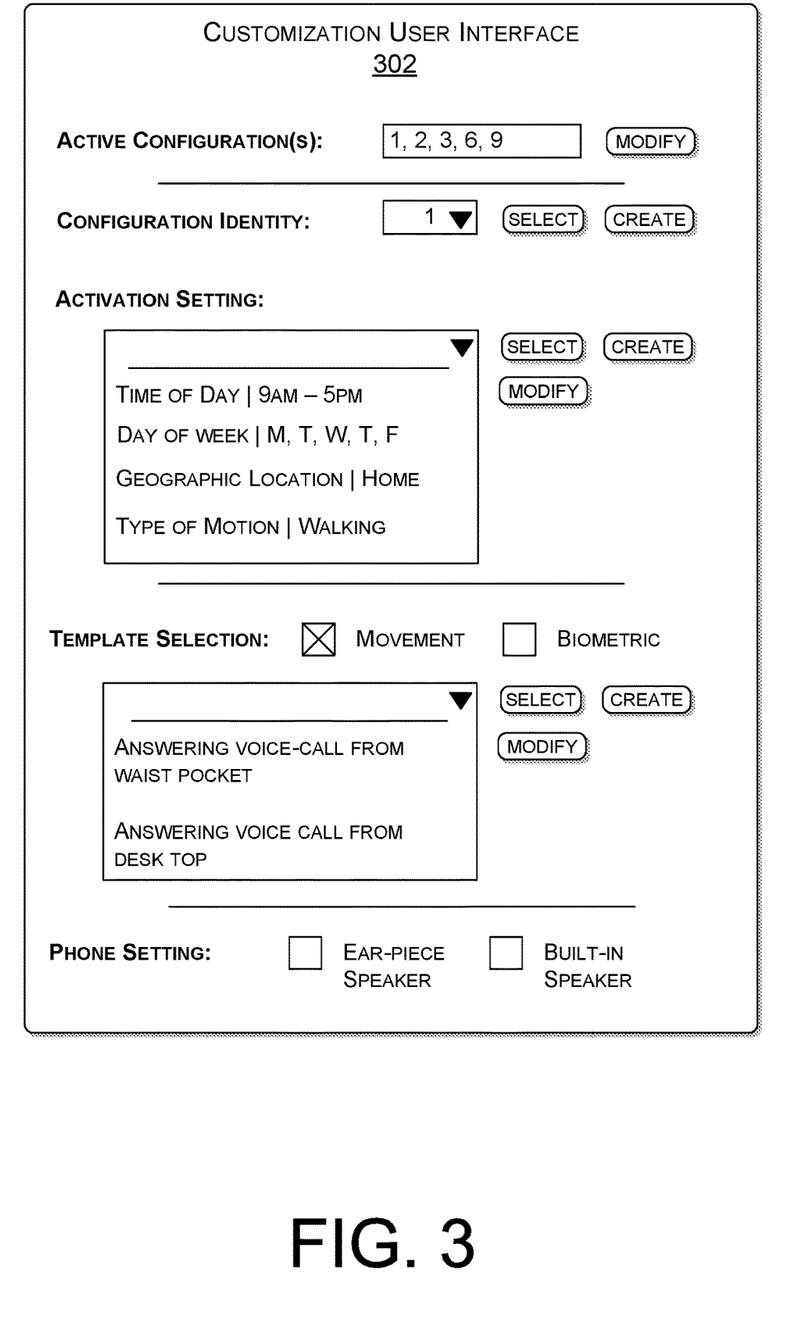
FIG. 3 illustrates a user interface (UI) to customize configuration settings for automatically answering an incoming voice-call.

FIG. 3 illustrates a user interface 302 to customize configuration settings for automatically answering an incoming voice-call. The user interface 302 may include one or more customization sections that allow a user to generate different operational configurations for automatically answering a voice-call. For example, the customization sections may include an active configuration section, a configuration identity section, an activation setting section, a template selection section, and a phone setting section.

In the illustrated example, the active configuration section allows a user to select a number of predefined configurations for active use on the mobile device. The predefined configurations correspond to different activation settings and template selection criteria, as discussed in more detail below.

The configuration identity section allows a user to create or modify one or more configurations that enable an operation to automatically answer a voice-call on the mobile device. The configuration identity section is a numerical listing of consecutive configuration. As a non-limiting example, a first configuration may correspond to a home setting, a second configuration may correspond to a work setting, and a third configuration may correspond to a setting associated with a particular physical activity, such as running.

The activation setting section may be a subsection associated with a particular configuration identity section. The activation setting section allows a user to select, create and modify different criteria that control when to enable automatic voice-call answering on the mobile device. Particularly, the activation setting section may allow a user to enable automatic voice-call answering when a user is at a home location, work location, or other known location frequently visited by the user. In other examples, an operation to automatically answer a voice-call may be enabled during particular times of the day, particular days of the week, or while the user is engaged in a particular type of motion, such as running.

The template selection section may allow a user to select, create, or modify a registered movement template or a registered biometric template. The template selection section may be a subsection associated with a particular configuration identity section. Particularly, the template selection section may allow a user to associate a registered movement template or a registered biometric template to a particular configuration identity section. For example, a user may associate a registered biometric template of capturing a facial image of the user, with a configuration identity that corresponds to a work location. In another example, a user may associate a registered movement template of moving the mobile device from the user's waist pocket to the user's ear and mouth, with a configuration identity that corresponds to a walking motion.

To create a registered movement template, a user may be prompted to repeatedly perform a particular motion. The particular motion may correspond to moving the mobile device from a first static position located away from the user's ear and mouth, to a second position held near the user's ear and mouth. The first static position may correspond to a user's waist pocket, or a user's office desk, or a desk drawer. In another example, the particular motion may correspond to a 'side tap' of the mobile device.

In various examples, the user may be required to repeat the particular motion a predetermined number of times. In doing so, a statistically reliable template may be constructed as a registered movement template.

To create a registered biometric template, a user may be prompted to select, via one or more selectable options, a type of biometric data. The types of biometric data are limited only by the sensory capability of the mobile device. In a non-limiting example, the biometric data may correspond to a facial image of the user, a grip configuration of the mobile device, a heart-beat pattern, a hand thermogram, a facial thermogram, as well as other vascular biometrics such as blood pressure.

In response to receiving a selection of a type of biometric data, the user may be prompted to provide biometric samples of the particular type of biometric data. The user may be required to provide several biometric samples of the same type of biometric data to ensure that a statistically reliable template of the biometric data is used to construct the registered biometric template.

The phone setting section may be a sub-section associated with a particular configuration identity section. The phone setting section may provide the user with a selectable option to turn on a built-in speaker of the mobile device at a same time as automatically answering an incoming voice-call. For example, a user may be working and prefer a voice-call to be automatically answered without requiring the user to move the mobile device to the user's ear and mouth.

Figure 4:
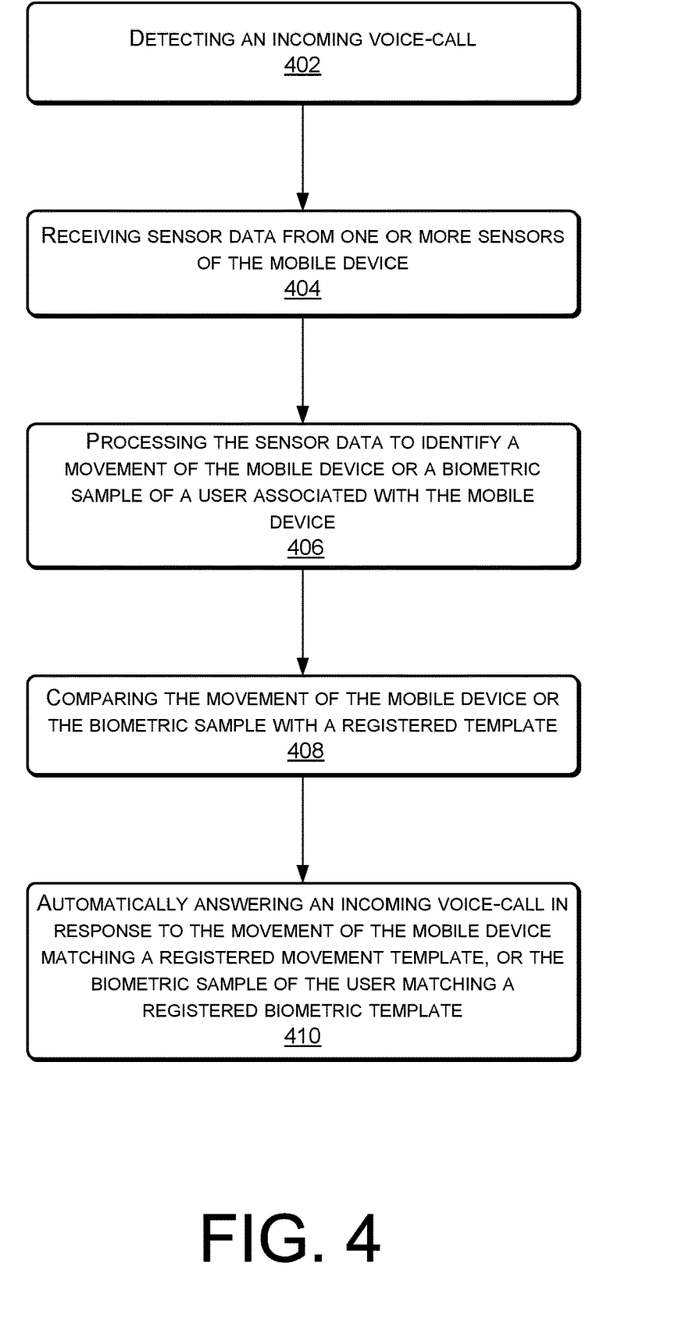
FIG. 4 illustrates is a flow diagram of a process for automatically answering an incoming voice-call in response to detecting a movement of the mobile device or receiving a biometric sample from a user of the mobile device.

FIG. 4 illustrates is a flow diagram of a process for automatically answering an incoming voice-call in response to detecting a movement of the mobile device or receiving a biometric sample from a user of the mobile device.

At 402, the voice-call answering application may detect an incoming voice-call that is directed to the mobile device. In doing so, the voice-call answering application may enable particular functionality of the automatic voice-call answering application, on the mobile device.

At 404, the voice-call answering application may receive sensor data from one or more sensors of the mobile device. In some examples, the one or more sensors that may detect a movement of the mobile device may include accelerometer(s), proximity sensor(s), gyroscope(s), digital camera(s), and/or GPS sensor(s). Further, one or more sensors that may capture a biometric sample of a user of the mobile device may include a digital camera(s), capacitance sensor, an odor sensor, and a heart-beat sensor.

At 406, the voice-call answering application may process the sensor data to identify a movement of the mobile device or a biometric sample of a user associated with the mobile device. In a non-limiting example, the sensor data may detect a movement of the mobile device from a first position that is away from a user's ear and mouth to a second position that is adjacent to the user's ear and mouth. In another non-limiting example, the sensor data may detect a biometric sample of a user of the mobile device. The biometric sample may be detected unobtrusively, without requiring the user to engage with the mobile device. Examples of unobtrusive biometric samples may include capturing an image of a user's face, heart beat patterns, rhythms in heart rate, odor, and pheromone. Thus, the user is only required to be within a predetermined distance of the mobile device that is sufficient to capture the unobtrusive biometric sample.

At 408, the voice-call answering application may compare the detected movement or the captured biometric sample with a registered template. In various examples, the registered template may be predefined by the user via a customization menu, and defined by the user repeatedly performing a particular motion, or repeatedly entering a particular biometric sample.

At 410, the voice-call answering application may automatically answer the incoming voice-call in response to the movement of the mobile device matching a registered movement template, or a biometric sample of the user of the mobile device matching a registered biometric template. In doing so, the user is able to automatically answer an incoming voice-call without interacting with a user interface of the mobile device.

Figure 5:
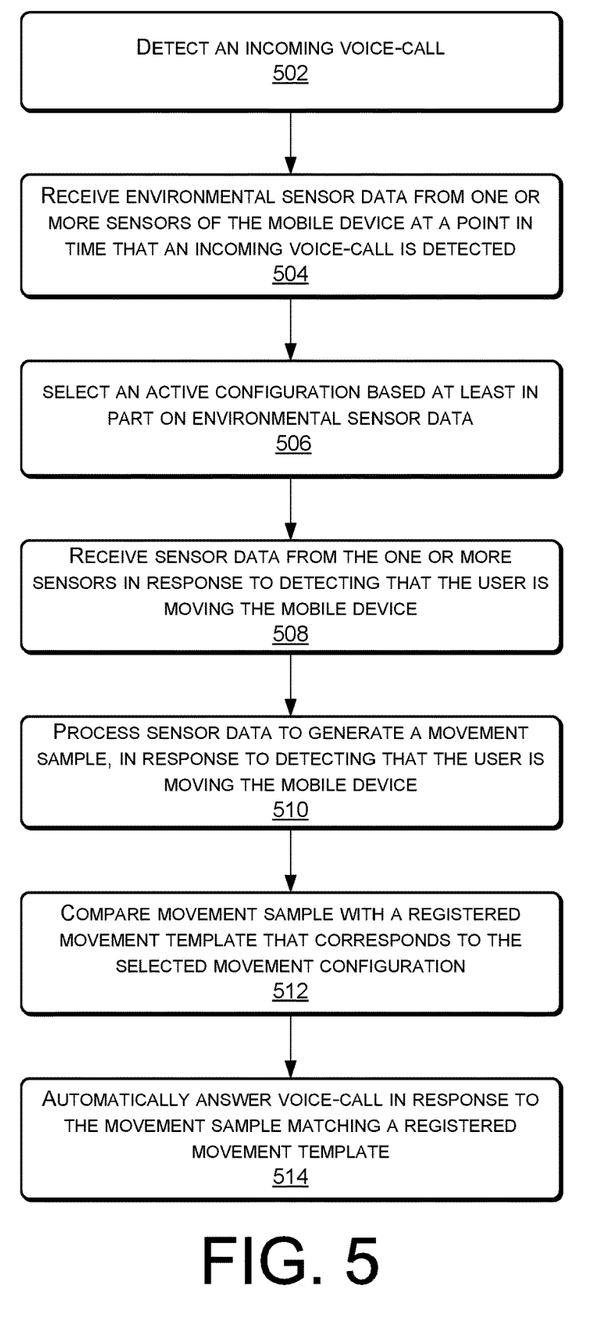
FIG. 5 illustrates a flow diagram of a process of selecting a configuration that identifies a registered movement template that supports automatically answering an incoming voice-call, and further automatically answering a voice-call in response to a movement of the mobile device matching the registered movement template.

FIG. 5 illustrates a flow diagram of a process of selecting a configuration that identifies a registered movement template that supports automatically answering an incoming voice-call, and further automatically answering a voice-call in response to a movement of the mobile device matching the registered movement template. At 502, the voice-call answering application may detect an incoming voice-call that is directed to the mobile device.

At 504, the voice-call answering application may receive environmental sensor data from one or more sensors of the mobile device at a point in time that an incoming voice-call is detected. The environmental sensor data may indicate a particular type of motion of the mobile device and the user, such as walking or running, or a particular geographic location, such as a home location or a work location. In some examples, the one or more sensors that detect a movement of the mobile device may include accelerometer(s), proximity sensor(s), gyroscope(s), digital camera(s), and/or GPS sensor(s).

At 506, the voice-call answering application may select an active configuration for automatically answering a voice-call, based at least in part on the environmental sensor data. The active configuration may associate a particular type of motion or particular geographic location with a particular registered movement template. For example, the environmental sensor data may indicate that the user of the mobile device is walking. Thus, the voice-call answering application may select an active configuration that associates a walking motion with a registered movement template of moving the mobile device from a user's waist pocket to a position adjacent to the user's ear and mouth.

At 508, the voice-call answering application may receive sensor data that detects a movement of the mobile device relative to a position of the user. The voice-call answering application may receive the sensor data from the one or more sensors of the mobile device. In some examples, determining a relative position of the mobile device to the user ensures that a synchronized movement of the mobile device and user (i.e. a user walking or running with the mobile device) is not mistakenly interpreted as a movement of the mobile device that is intended to answer an incoming voice-call. A relative position of the mobile device with respect to the user may be determined by a proximity sensor(s) or a digital camera of the mobile device.

At 510, the voice-call answering application may process the sensor data to generate a movement sample. The movement sample may represent change in position and orientation of the mobile device from a first position and orientation away from the user's ear and mouth, to a second position that is adjacent to the user's ear and mouth.

At 512, the voice-call answering application may compare the movement sample of the mobile device with a registered movement template that corresponds to the active configuration. In some examples, the registered movement template may include a movement of the mobile device from a first position and orientation away from the user's ear and mouth, to a second position and orientation that is adjacent to the user's ear and mouth.

At 514, the voice-call answering application may automatically answer an incoming voice-call in response to the movement sample matching a registered movement template. In doing so, the user is able to automatically answer an incoming voice-call without interacting with a user interface of the mobile device.

Figure 6:
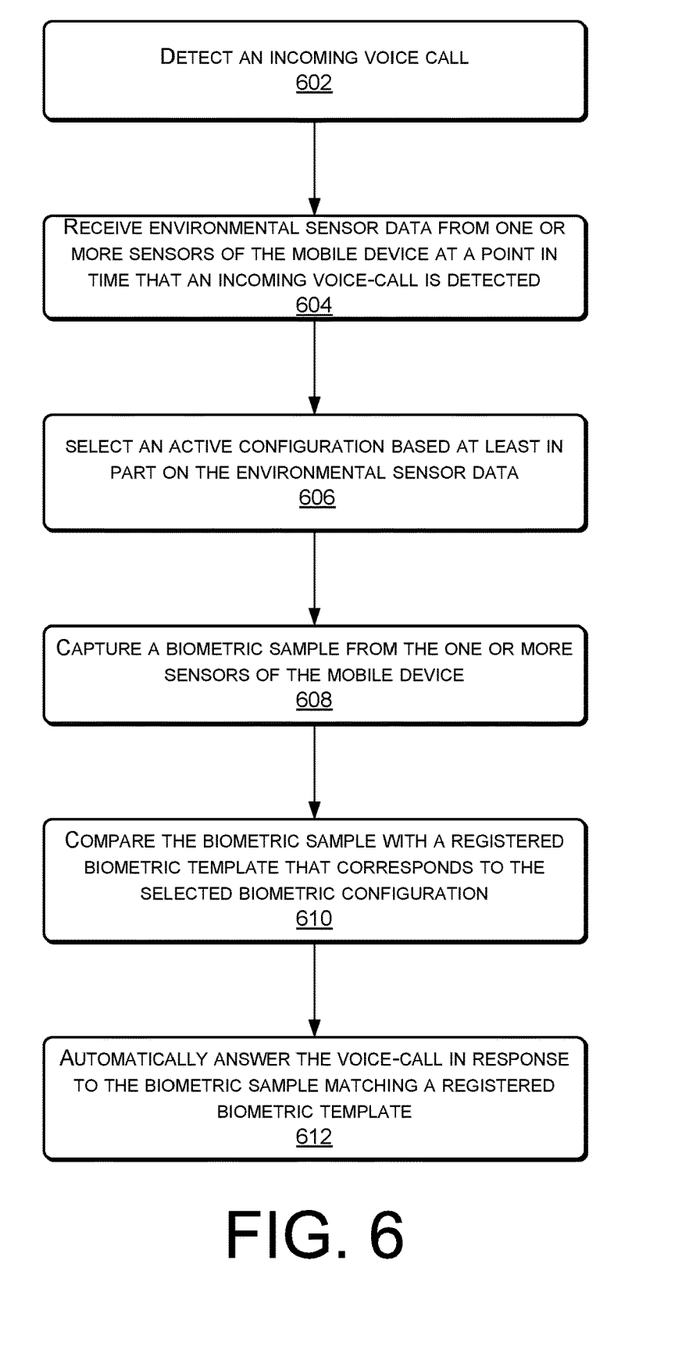
FIG. 6 illustrates a flow diagram of a process of selecting a configuration that identifies a registered biometric template that supports automatically answering an incoming voice-call, and further automatically answering a voice-call in response to a biometric sample received from a user of the mobile device matching the registered biometric template.

FIG. 6 illustrates a flow diagram of a process of selecting a configuration that identifies a registered biometric template that supports automatically answering an incoming voice-call, and further automatically answering a voice-call in response to a biometric sample received from a user of the mobile device matching the registered biometric template. At 602, the voice-call answering application may detect an incoming voice-call that is directed to the mobile device.

At 604, the voice-call answering application may receive environmental sensor data from one or more sensors of the mobile device at a point in time that an incoming voice-call is detected. The environmental sensor data may indicate a particular type of motion of the mobile device and the user, such as walking or running, or a particular geographic location, such as a home location or a work location. In some examples, the one or more sensors that detect a movement of the mobile device may include accelerometer(s), proximity sensor(s), gyroscope(s), digital camera(s), and/or GPS sensor(s).

At 606, the voice-call answering application may select an active configuration for automatically answering a voice-call based at least in part on the environmental sensor data. The active configuration may associate a particular motion or particular geographic location with a particular registered biometric template. For example, the environmental sensor data may indicate that the user of the mobile device is at a work location. The voice-call answering application may select an active configuration that associates the work location with a registered biometric template that unobtrusively captures a facial image of the user.

At 608, the voice-call answering application may capture a biometric sample using one or more biometric sensors of the mobile device. The one or more biometric sensors that may capture a biometric sample may include a digital camera, a capacitance sensor, an odor sensor, or a heart-beat sensor.

At 610, the voice-call answering application may compare the biometric sample of the mobile device with a registered biometric template that corresponds to the active configuration. In some examples, the registered biometric template may correspond to a relative position of fingers when holding and touching the mobile device. Other types of registered biometric template may include a facial image of a user, or a hand thermogram that may employ a heat-based signature.

At 612, the voice-call answering application may automatically answer an incoming voice-call in response to the biometric sample matching a registered biometric template. In doing so, the user is able to automatically answer an incoming voice-call without interacting with a user interface of the mobile device.

CONCLUSION

Although the subject matter has been described in language specific to features and/or methodological acts, it is to be understood that the subject matter defined in the appended claims is not necessarily limited to the specific features or acts described herein. Rather, the specific features and acts are disclosed as exemplary forms of implementing the claims.

What is claimed:
1. A computer-implemented method, comprising:
under control of one or more processors:
detecting an incoming voice-call on a mobile device;
receiving, from one or more sensors of the mobile device, three-dimensional sensor data indicating at least a movement of the mobile device relative to a user of the mobile device;
comparing the movement of the mobile device with a registered movement template, the registered movement template being selected by a user from a plurality of registered movement templates, the registered movement templates indicating three-dimensional motion of the mobile device; and
causing the mobile device to automatically answer the incoming voice-call, based at least in part on the movement of the mobile device matching the registered movement template.
2. The computer-implemented method of claim 1, further comprising:

causing a user interface to display on the mobile device, the user interface providing a list of selectable options to create the registered movement template;

receiving, via the user interface, a selection to create the registered movement template;

prompting, via the user interface, the user to create a movement of the mobile device that is to be associated with the registered movement template; and creating the registered movement template based at least in part on receiving the movement of the mobile device.

3. The computer-implemented method of claim 2, wherein prompting the user to create the movement of the mobile device is a first prompt, and further comprising:

providing at least a second prompt to repeat the movement of the mobile device that is to be associated with the registered movement template; and wherein creating the registered movement template is further based at least in part on receiving a second movement that corresponds to at least the second prompt.

4. The computer-implemented method of claim 1, wherein the registered movement template corresponds to a first registered movement template of a plurality of registered movement templates, and further comprising:

determining a geographic location of the mobile device based at least in part on the sensor data; and wherein comparing the movement of the mobile device with the first registered movement template is further based at least in part on the geographic location.

5. The computer-implemented method of claim 1, further comprising:

receiving, via a user interface on the mobile device and prior to detecting the incoming voice call on the mobile device, an activation setting that enables automatic answering of the incoming voice-call, based at least in part on a first geographic location;

in response to detecting the incoming voice-call on the mobile device, determining a second geographic location that corresponds to the mobile device; and wherein causing the mobile device to automatically answer the incoming voice-call is further part at least in part on the second geographic location of the mobile device being within a predetermined distance of the first geographic location.

6. The computer-implemented method of claim 1, wherein the one or more sensors of the mobile device include at least one of accelerometers, a gyroscope, a proximity sensor, a global positioning system sensor, and a digital camera.

7. The computer-implemented method of claim 1, wherein causing the mobile device to automatically answer the incoming voice-call is further based at least in part on the time of day or the day of the week.

8. A system, comprising:

one or more sensors of a mobile device, the one or more sensors detecting at least a movement of the mobile device;

one or more processors coupled to the one or more sensors;

memory coupled to the one or more processors, the memory including one or more modules that are executable by the one or more processors to:

receive sensor data from the one or more sensors of the mobile device;

determine a first three-dimensional movement of the mobile device based at least in part on the sensor data, the first movement corresponding to a synchronized motion of the mobile device and a user;

determine a second three-dimensional movement of the mobile device based at least in part on the sensor data, the second movement corresponding to a motion of the mobile device being placed in proximity to an ear of the user;

select an active configuration based at least in part on the synchronized motion of the mobile device and the user, the active configuration identifying a user-selected registered movement template for comparison with the movement of the mobile device;

compare the second three-dimensional movement of the mobile device with the user-selected registered movement template; and cause the mobile device to automatically answer an incoming voice-call based at least in part on the second three-dimensional movement of the mobile device matching the user-selected registered movement template.

9. The system of claim 8, wherein the one or more sensors that indicate the movement of the mobile device include at least one of accelerometers, a gyroscope, a proximity sensor, a global positioning system sensor, and a digital camera.

10. The system of claim 8, wherein the active configuration further includes an activation setting that enables automatic answering of the incoming voice-call based at least in part on a time of day or a day of a week; and wherein to cause the mobile device to automatically answer the incoming voice-call is further based at least in part on the time of day or the day of the week.

11. The system of claim 8, wherein the one or more modules are further executable by the one or more processors to:

cause a user interface to display on the mobile device, the user interface providing a list of selectable options to create the user-selected registered movement template;

receive, via the user interface, a selection to create the user-selected registered movement template;

prompt, via the user interface, the user to create a movement of the mobile device that is to be associated with the user-selected registered movement template; and create the user-selected registered movement template based at least in part on receiving the movement of the mobile device.

12. The system of claim 11, wherein the prompt to the user to create the movement of the mobile device is a first prompt, and the one or more modules are further executable by the one or more processors to:

provide at least a second prompt to repeat the movement of the mobile device that is to be associated with the user-selected registered movement template; and creating the user-selected registered movement template based at least in part on receiving a second movement that corresponds to at least the second prompt.

13. The system of claim 8, wherein the user-selected registered movement template corresponds to a first registered movement template of a plurality of registered movement templates, and the one or more modules are further executable by the one or more processors to:

determine a geographic location of the mobile device based at least in part on the sensor data; and comparing the second three-dimensional movement of the mobile device with the first registered movement template based at least in part on the geographic location.

14. The system of claim 8, wherein the one or more modules are further executable by the one or more processors to:
- receive, via a user interface on the mobile device and prior to the incoming voice call, an activation setting that enables automatic answering of the incoming voice-call, based at least in part on a first geographic location;
- detect the incoming voice-call on the mobile device;
- determine a second geographic location that corresponds to the mobile device; and
- cause the mobile device to automatically answer the incoming voice-call is based at least in part on the second geographic location of the mobile device being within a predetermined distance of the first geographic location.

15. A non-transitory computer storage medium having stored thereon programming instructions that, when executed by a mobile device, cause the mobile device to perform operations comprising:
- detecting an incoming voice-call on the mobile device;
- receiving, from one or more sensors of the mobile device, three-dimensional sensor data indicating at least a movement of the mobile device relative to a user of the mobile device;
- comparing the movement of the mobile device with a registered movement template, the registered movement template being selected by a user from a plurality of registered movement templates, the registered movement templates indicating three-dimensional motion of the mobile device; and
- causing the mobile device to automatically answer the incoming voice-call, based at least in part on the movement of the mobile device matching the registered movement template.

16. The non-transitory computer storage medium of claim 15, wherein the operations further comprise:
- causing a user interface to display on the mobile device, the user interface providing a list of selectable options to create the registered movement template;
- receiving, via the user interface, a selection to create the registered movement template;
- prompting, via the user interface, the user to create a movement of the mobile device that is to be associated with the registered movement template; and
- creating the registered movement template based at least in part on receiving the movement of the mobile device.

17. The non-transitory computer storage medium of claim 15, wherein the registered movement template corresponds to a first registered movement template of a plurality of registered movement templates, and the operations further comprise:
- determining a geographic location of the mobile device based at least in part on the sensor data; and
- wherein comparing the movement of the mobile device with the first registered movement template is further based at least in part on the geographic location.

18. The non-transitory computer storage medium of claim 15, wherein the operations further comprise:
- receiving, via a user interface on the mobile device and prior to detecting the incoming voice call on the mobile device, an activation setting that enables automatic answering of the incoming voice-call, based at least in part on a first geographic location;
- in response to detecting the incoming voice-call on the mobile device, determining a second geographic location that corresponds to the mobile device; and
- wherein causing the mobile device to automatically answer the incoming voice-call is further part at least in part on the second geographic location of the mobile device being within a predetermined distance of the first geographic location.

19. The non-transitory computer storage medium of claim 15, wherein the one or more sensors of the mobile device include at least one of accelerometers, a gyroscope, a proximity sensor, a global positioning system sensor, and a digital camera.

20. The non-transitory computer storage medium of claim 15, wherein causing the mobile device to automatically answer the incoming voice-call is further based at least in part on the time of day or the day of the week.

* * * * *